(12) United States Patent
Hogan et al.

(10) Patent No.: US 8,603,639 B2
(45) Date of Patent: Dec. 10, 2013

(54) GLOSS RESINS AND METHOD FOR MAKING SAME

(75) Inventors: Todd A. Hogan, Sanford, MI (US); Malcolm F. Finlayson, Houston, TX (US); Brian W. Walther, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 986 days.

(21) Appl. No.: 12/571,689

(22) Filed: Oct. 1, 2009

(65) Prior Publication Data

US 2010/0086798 A1 Apr. 8, 2010

Related U.S. Application Data

(60) Provisional application No. 61/102,212, filed on Oct. 2, 2008.

(51) Int. Cl.
*B32B 27/08* (2006.01)

(52) U.S. Cl.
USPC ........................................ 428/516

(58) Field of Classification Search
None
See application file for complete search history.

(56) References Cited

U.S. PATENT DOCUMENTS

| | | | |
|---|---|---|---|
| 4,837,074 A | 6/1989 | Rosinski et al. | |
| 5,174,848 A | 12/1992 | Yazaki et al. | |
| 5,372,881 A | 12/1994 | Roller et al. | |
| 5,717,029 A | 2/1998 | Bonecamp et al. | |
| 5,972,520 A * | 10/1999 | Howell | 428/516 |
| 6,008,294 A | 12/1999 | Bonecamp | |
| 6,177,515 B1 | 1/2001 | Smith et al. | |
| 6,306,518 B1 | 10/2001 | Shah et al. | |
| 6,489,019 B1 | 12/2002 | Shah et al. | |
| 6,561,122 B1 | 5/2003 | Kurja et al. | |
| 6,776,924 B2 | 8/2004 | Walters et al. | |
| 6,784,252 B2 * | 8/2004 | Ramanathan et al. | 525/240 |
| 7,087,680 B2 | 8/2006 | Pierini et al. | |
| 2005/0070673 A1 | 3/2005 | Novak et al. | |
| 2007/0278717 A1 | 12/2007 | Novak et al. | |

FOREIGN PATENT DOCUMENTS

| | | |
|---|---|---|
| CA | 2287718 A1 | 4/2001 |
| EP | 1279493 A1 | 1/2003 |
| WO | 99/10424 A1 | 3/1999 |
| WO | 2006/026058 A1 | 3/2006 |

* cited by examiner

*Primary Examiner* — Sheeba Ahmed
(74) *Attorney, Agent, or Firm* — Whyte Hirschboeck Dudek S.C.

(57) ABSTRACT

The present disclosure is directed to polymeric compositions which form gloss resins suitable for thermoforming applications. The polymeric compositions include a reaction product composed of a clarified random propylene/α-olefin copolymer, a coupling agent, and optionally an elastomer. Methods for adjusting the melt flow rate of the gloss resin are also disclosed. Adjustment of the gloss resin melt flow rate advantageously enables scrap thermoplastic material containing the gloss resin to be recycled in a thermoforming operation.

20 Claims, No Drawings

GLOSS RESINS AND METHOD FOR MAKING SAME

CROSS-REFERENCE TO RELATED APPLICATION

This application claims priority to U.S. provisional application Ser. No. 61/102,212 filed on Oct. 2, 2008, the entire content of which is incorporated herein by reference.

BACKGROUND

The present disclosure relates to thermoplastic polyolefin ("TPO") compositions that provide a gloss finish to thermoformed articles.

The use of TPOs in thermoforming applications is known. The thermoforming process typically includes heating a film or a sheet of an extruded TPO at or above the softening temperature of the TPO. The softened sheet is fit along the contours of a mold with pressure supplied from vacuum, air pressure, and/or mechanical draw. The mold is used to form a molded article. Match mold thermoforming places the softened sheet between two cooperating molds. The formed article is cooled, removed from the mold, and trimmed as necessary.

In a typical thermoforming operation, up to as much as 60% of the original TPO sheet is lost as scrap. Attempts to recycle and incorporate scrap into thermoplastic polyolefins have been problematic. This is particularly the case with TPO sheets capped with a gloss layer. The presence of the gloss layer in the scrap lowers the melt strength of the scrap-containing thermoformed sheet. Scrap-containing TPOs also experience an increase in the sag rate during heating of the sheet. This deleteriously impacts the thermoforming operation, causing operability problems and product degradation.

The inability to utilize this high degree of scrap from capped TPO sheets is inefficient and expensive. Desirable would be a thermoplastic polyolefin having a gloss layer that does not negatively impact the thermoforming process or product quality when scrap material of the thermoplastic polyolefin is added to a subsequent thermoplastic composition.

SUMMARY

The present disclosure provides polymeric compositions, structures, and films as well as methods for using the same in a thermoforming operation. The polymeric compositions are particularly suited to be recycled in a thermoforming operation.

In an embodiment, a polymeric composition is provided. The polymeric composition includes a reaction product of a clarified random propylene/α-olefin copolymer and a coupling agent. The coupling agent may be a bis(sulfonyl azide). The polymeric composition has a Gardner gloss at 60° of greater than 60 as measured in accordance with ASTM D-523. In a further embodiment, the polymeric composition has a Gardner gloss at 60° of greater than 80.

The polymeric composition has a melt flow rate from about 0.1 g/10 min to about 2.0 g/10 min as measured in accordance with ASTM D-1238, 2.16 kg at 230° C. The polymeric composition has less than 20% haze as measured in accordance with ASTM D-1003. The polymeric composition has a flexural modulus from about 100 kpsi to about 200 kpsi as measured in accordance with ASTM D-790 and a notched Izod impact strength at 23° C. from about 3 ft-lb/in to about 14 ft-lb/in as measured in accordance with ASTM D-256.

In an embodiment, the random propylene/α-olefin copolymer is a random propylene/ethylene copolymer containing less than 6% by weight ethylene copolymer.

In an embodiment, the reaction product includes the clarified random propylene/α-olefin copolymer, an elastomer and the coupling agent. The elastomer may be an ethylene/α-olefin copolymer. The reaction product of the propylene/α-olefin copolymer, elastomer and coupling agent has a melt flow rate from about 1.0 g/10 min to about 2.0 g/10 min (ASTM D-1238, 2.16 kg at 230° C.), a notched Izod impact strength at 23° C. from about 10 ft-lb/in to about 20 ft-lb/in (ASTM D-256) and an average flexural modulus from about 90 kpsi to about 100 kpsi (ASTM D-790).

In an embodiment, a multiple layer sheet is provided. The multiple layer sheet includes a base layer in contact with a cap layer. The base layer is composed of a thermoplastic polyolefin. The cap layer is composed of a reaction product of the clarified random propylene/α-olefin copolymer and the coupling agent. The cap layer has a Gardner gloss at 60° of greater than 60 (ASTM D-523). In a further embodiment, the cap layer has a Gardner gloss at 60° greater than 80.

In an embodiment, the thermoplastic polyolefin is a blend of (i) a propylene impact copolymer and (ii) an elastomer.

In an embodiment, the cap layer is a reaction product of the clarified random propylene/α-olefin copolymer, an elastomer, and the coupling agent. The elastomer present in the reaction product may be an ethylene/α-olefin copolymer.

In an embodiment, the gloss resin has a melt flow rate from about 0.5 g/10 minutes to about 2.0 g/10 minutes.

In an embodiment, a method for producing a sheet is provided. The method includes blending a virgin thermoplastic polyolefin with a multiple layer structure to form a recycled sheet. The virgin thermoplastic polyolefin has a sag rate $SR_V$. The recycled sheet has a sag rate $SR_R$. The multiple layer structure has a base layer and a cap layer. The cap layer includes a gloss resin. The method includes adjusting a melt flow rate of the gloss resin so that the recycled sheet has a sag resistance index (SRI) less than or equal to about 1.5. The SRI is determined by way of the following equation.

$$SRI = \frac{SR_R}{SR_V}$$

Adjustment to the gloss resin melt flow rate occurs before the blending. The blending can be melt blending, extrusion blending, or a combination thereof.

In an embodiment, the method includes decreasing the gloss resin melt flow rate. This decreases the SRI value. The gloss resin melt flow rate can be decreased to maintain the SRI to less than or equal to about 1.2.

In an embodiment, the gloss resin is composed of a clarified random propylene/α-olefin copolymer. The method includes coupling the clarified random propylene/α-olefin copolymer. The coupling decreases the melt flow rate of the gloss resin to less than 2.0 g/10 min.

In an embodiment, the gloss resin is composed of a clarified random propylene/α-olefin copolymer and an elastomer. The method includes coupling the clarified random propylene/α-olefin copolymer and the elastomer. The coupling decreases the melt flow rate of the gloss resin to less than 2.0 g/10 min.

In an embodiment, the method includes adding from about 40 wt % to about 60 wt % of the virgin thermoplastic polyolefin to from about 60 wt % to about 40 wt % of the multiple layer structure to form the recycled sheet.

In an embodiment, the method includes adjusting the amount of the multiple layer structure present in the recycled sheet and forming the recycled sheet to contain from about 5 wt % to about 15 wt % of the gloss resin.

In an embodiment, the method includes collecting a scrap material and blending the scrap material with the virgin thermoplastic polyolefin to form the recycled sheet. The recycled sheet can be thermoformed into an article.

In an embodiment, a multiple layer sheet containing recycled material is provided. The multiple layer sheet includes a base layer and a cap layer. The base layer is a blend of (i) the virgin thermoplastic polyolefin and (ii) the multiple layer structure. The multiple layer structure has a first layer (i.e., a cap layer) composed of the gloss resin and a second layer (i.e., a base layer) composed of TPO. The cap layer is a coupled clarified random propylene/α-olefin copolymer. The virgin TPO and the multiple layer structure are melt blended and/or extrusion blended before or during formation of the multiple layer sheet. The multiple layer structure is one or more pieces of scrap material, the pieces of scrap material being blended with the virgin TPO. Thus, the base layer is composed of recycled material.

In an embodiment, the base layer includes from about 90 wt % to about 95 wt % of the thermoplastic polyolefin (virgin TPO+TPO from the second layer of the multilayer structure). In another embodiment, the base layer includes about 40 wt % to about 60 wt % of the recycled composition. In a further embodiment, the recycled composition includes from about 5 wt % to about 15 wt % of the gloss resin.

DETAILED DESCRIPTION

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, in reference to density, weight percent of component, molecular weights and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron spectroscopy.

In an embodiment, a polymeric composition is provided. The polymeric composition includes a reaction product composed of a clarified random propylene/α-olefin copolymer and a coupling agent. The polymeric composition has a Gardner gloss at 60° of greater than 60.

As used herein, "a clarified random propylene/α-olefin copolymer" is a random copolymer of propylene and an α-olefin with a clarifying agent. The clarifying agent reduces the haze value of the random propylene and α-olefin copolymer (ASTM D 1003) by at least 10%. Thus, a "clarified random propylene/α-olefin copolymer" has a haze value that is at least 10% less than the haze value of the random propylene and α-olefin copolymer without the clarifying agent.

The clarifying agent reduces the size of crystallites, thereby improving the transparency and clarity of articles made from the copolymer. Not wishing to be bound by any particular theory, it is believed that the clarifying agents act as sites for more ordered and faster polyolefin crystallization during cooling. During the process of crystallization, polymer crystals organize into larger superstructures which are referred to as spherulites. The spherulites are more uniform and are smaller in size than spherulites formed in the absence of the clarifying agent. The reduced spherulite size reduces the possibility for light to be scattered. In this way, the clarifying agent improves the optical opacity of the random propylene/α-olefin copolymer. In an embodiment, the clarified random propylene/α-olefin copolymer has a refractive index of about 1.5044 at 589 nm and a haze measurement of about 8.0% or lower.

Nonlimiting examples of suitable clarifying agents include dibenzylidene sorbitol acetal derivatives such as 1,3-O-2,4-bis(3,4-dimethylbenzylidene)sorbitol, available from Milliken Chemical Spartanburg, S.C. under the trade name Millad® 3988, 1,3-O-2,4-bis(p-methylbenzylidene)sorbitol, also available from Milliken Chemical under the trade name Millad® 3940, sodium 2,2'-methylene-bis-(4,6-di-tert-butylphenyl) phosphate (from Asahi Denka Kogyo K. K., known as NA-11), aluminum bis[2,2'-methylene-bis-(4,6-di-tert-butylphenyl)phosphate] (also from Asahi Denka Kogyo K. K., known as NA-21), or other nucleators, particularly those which provide extremely quick crystal formation and/or arrangement. The clarified random propylene/α-olefin copolymer may include optional additives such as plasticizers, antistatic agents, antioxidants, stabilizers, acid neutralizers, and ultraviolet absorbers.

The random propylene/α-olefin copolymer is a random copolymer of propylene and a minor proportion of one or more α-olefins, a diene, or a mixture or blend of α-olefins. The mixture can be a mechanical blend or an in situ blend. Nonlimiting examples of suitable α-olefin comonomers for polymerizing with propylene include ethylene, 1-butene, 1-pentene, 1-hexene, 1-heptene, 1-octene, 1-nonene, 1-decene, 1-unidecene, 1-dodecene. The random propylene/α-olefin copolymer may include less than 10 percent by weight (or any value less than 10 percent) of one or more comonomers based on the total weight of the random propylene copolymer. In an embodiment, the random propylene/α-olefin copolymer may include less than 8 percent by weight of one or more comonomers based on the total weight of the random propylene/α-olefin copolymer, or the random propylene copolymer may include less than 6 percent by weight of one or more comonomers based on the total weight of the random propylene/α-olefin copolymer. In an embodiment, the random propylene/α-olefin copolymer is a random propylene and ethylene copolymer. In a further embodiment, the random propylene and ethylene copolymer contains less than 5 percent by weight ethylene or about 3 percent by weight ethylene.

The random propylene/α-olefin copolymer can be prepared by various processes, for example, in a single stage or in multiple stages, by such polymerization methods as slurry polymerization, liquid pool process, gas phase polymerization, bulk polymerization, solution polymerization or a combination thereof using a metallocene catalyst or a Ziegler-Natta catalyst, which usually is one having a solid transition metal component of titanium. In an embodiment, the catalyst contains a transition metal/solid component, a solid composition of titanium trichloride which includes components titanium, magnesium and a halogen; an organometallic component such as an organoaluminum compound; and, optionally, an electron donor. The electron donor may be an organic compound containing a nitrogen atom, a phosphorous atom, a sulfur atom, a silicon atom or a boron atom. The electron donor may also be an ester compound or an ether compound containing these atoms.

In an embodiment, the clarified random propylene/α-olefin copolymer is made with a Ziegler-Natta catalyst and is available from The Dow Chemical Company of Midland, Mich. under the designation Dow 6D83K Polypropylene Resin. Dow 6D83K is a clarified random propylene and ethylene copolymer and contains about 3 percent, or 3.2 percent by weight units derived from ethylene and has a melt flow rate of about 1.9 g/10 min. This clarified random propylene-ethylene copolymer exhibits a heat of fusion of approximately 93 Joules/gram, a molecular weight distribution (Mw/Mn) of about 4.5 and a melting point of about 145° C. The properties for Dow 6D83K are provided in Table 1 below.

TABLE 1

Dow 6D83K Physical Properties

| Property | Value | Test Method |
|---|---|---|
| Density | 0.9 g/cc | ASTM D792 |
| Melt Flow | 1.9 g/10 min | 230° C.; 2.16 kg; ASTM D1238 |
| Tensile Strength, Yield | 28.3 MPa | Molded and tested in accordance with ASTM D4101; ASTM D638 |
| Elongation at Yield | 10% | Molded and tested in accordance with ASTM D4101; ASTM D638 |
| Flexural Modulus | 155 kpsi | 1% Secant; molded and tested in accordance with ASTM D4101; ASTM D790A |
| Izod Impact, Notched, RT | 5.5 ft-lb/in | Molded and tested in accordance with ASTM D4101; ASTM D256A |
| Deflection Temperature at 0.46 MPa (66 psi) | 86.1° C. | Unannealed; molded and tested in accordance with ASTM D4101; ASTM D648 |

The polymeric composition also includes a coupling agent. As used herein, a "coupling agent" is a chemical compound that contains at least two reactive groups that are each capable of forming a carbene or nitrene group that are capable of inserting into the carbon hydrogen bonds of aliphatic, CH, $CH_2$, or $CH_3$ groups, and also aromatic CH groups, of a polymer chain. Nonlimiting examples of chemical compounds that contain reactive groups capable of forming carbene groups include diazo alkanes, geminally-substituted methylene groups, and metallocarbenes. Nonlimiting examples of chemical compounds that contain reactive groups capable of forming nitrene groups, include, but are not limited to, phosphazene azides, sulfonyl azides, formyl azides, and azides. The polymeric composition may include from about 200 to about 1000 parts by weight of the coupling agent per one million parts of the clarified random propylene/α-olefin copolymer. All individual values and subranges from 200 to 1000 parts per million are included herein. For example, the polymer composition may include 400 to 800 parts by weight of the coupling agent per one million parts of the clarified random propylene and α-olefin copolymer; or the polymer composition may include 400 to 600 parts by weight of the coupling agent per one million parts of the clarified random propylene/α-olefin copolymer composition. Exemplary coupling agents include, but are not limited to, poly(sulfonyl azide), and a bis(sulfonyl azide). Nonlimiting examples of poly(sulfonyl azide) include 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Nonlimiting examples of the bis(sulfonyl azide) include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof. In an embodiment, the coupling agent may be 4,4'-diphenyl oxide bis-sulfonyl azide.

Sulfonyl azides are commercially available or are prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

Sulfonyl azides and other azides can be shock sensitive. It may be necessary to phlegmatize the azides or to otherwise protect the azides from reaction during the manufacture and processing of the azide, or the shipping and handling of the azide. As used herein, "phlegmatizing" refers to methods for reducing the shock sensitivity of a chemical or chemical species by mixing or combining the reactive chemical with an inert or less reactive chemical. For example, an antioxidant and a coupling agent may be blended together to form a molecular melt, and that the formation of this molecular melt can phlegmatize the coupling agent as disclosed in U.S. Pat. No. 6,776,924, the entire content of which is incorporated by reference herein.

"Coupling", "coupling reaction", or "coupled" is the mechanism or the reaction by which the reactive groups of the coupling agent bond together polymer chains within the propylene/α-olefin copolymer. The coupling reaction between the clarified random propylene/α-olefin copolymer and the coupling agent yields a reaction product that is a coupled clarified random propylene/α-olefin copolymer. Not wishing to be bound by any particular theory, it is believed that the clarified random propylene/α-olefin copolymer contains linear polymer chains. The reactive groups of the coupling agent couple or otherwise bond these linear polymer chains together. This increases the amount of long-chain polymer branching within the clarified random propylene/α-olefin copolymer. This presence of long-chain polymer branching correspondingly increases the melt strength and reduces the melt flow rate (MFR) of the coupled clarified random propylene/α-olefin copolymer compared to the clarified random propylene/α-olefin copolymer. Thus, the reaction product is the coupled clarified random propylene/α-olefin copolymer.

Other types of coupling are within the scope of this disclosure. Coupling may be accomplished by way of silane coupling, peroxide coupling, and diene coupling. Coupling may also occur by way of graft maleic anhydride/diamine reaction. In addition, electron beam radiation can be used to introduce long-chain branching into the polymeric composition. Any of these procedures can be used to decrease the MFR of the polymeric composition.

The coupling reaction surprisingly and unexpectedly does not adversely impact the optical properties of the clarified propylene/α-olefin copolymer. The polymeric composition containing the coupled clarified random propylene/α-olefin copolymer has a Gardner gloss at 60° of greater than 60. The Gardner gloss value is determined in accordance with ASTM D-523. In an embodiment, the coupled clarified random propylene/α-olefin copolymer has a Gardner gloss at 60° greater than 80, or between about 80 and about 90 or about 86.5. The polymeric composition has less than 20% haze, or less than 10% haze, as measured in accordance with ASTMD-1003. The polymeric composition includes the clarified random propylene/α-olefin copolymer and from about 200 ppm to about 1000 ppm of the coupling agent. The polymeric composition has a melt flow rate from about 0.1 g/10 min to about 2.0 g/10 min or from about 0.5 g/10 min to about 1.5 g/10 min as measured in accordance with ASTM D-1238, 2.16 kg at 230° C. The polymeric composition has a flexural modulus from about 100 kpsi to about 200 kpsi, or from about 140 kpsi to about 150 kpsi, as measured in accordance with ASTM D-790. The polymeric composition has a notched Izod impact strength at 23° C. from about 3 ft-lb/in to about 14 ft-lb/in, or from about 5.0 ft-lb/in to about 6.0 ft-lb/in as measured in accordance with ASTM D-256.

In an embodiment, the polymeric composition includes an elastomer in addition to the clarified random propylene/α-olefin copolymer and the coupling agent. A coupling reaction between the clarified random propylene/α-olefin copolymer, the elastomer, and the coupling agent yields a reaction product that is a coupled clarified random propylene/α-olefin copolymer and elastomer. Not wishing to be bound by any particular theory, it is believed that the coupled clarified random propylene/α-olefin copolymer and elastomer includes (i) long-chain branches of random propylene/α-olefin copolymer, (ii) long-chain branches of elastomer polymer strands, and (iii) long-chain branches composed of random propylene/α-olefin copolymer chains and elastomer polymer strands. The presence of the long chain polymer branching increases the melt strength and reduces the MFR of the coupled clarified random propylene/α-olefin copolymer and elastomer compared to the clarified random propylene/α-olefin and elastomer. Thus, the reaction product is the coupled clarified random propylene/α-olefin copolymer and elastomer.

In an embodiment, the polymeric composition containing the coupled clarified random propylene/α-olefin copolymer and elastomer has a Gardner gloss at 60° of greater than 60, or from about 60 to about 70, or about 61 and a MFR from about 0.1 g/10 min to about 2.0 g/10 min (ASTM-1238, 2.16 kg at 230° C.). The polymeric composition also has a notched Izod impact strength at 23° C. from about 10 ft-lb/in to about 20 ft-lb/in (ASTM D-256) and an average flexural modulus from about 90 kpsi to about 100 kpsi (ASTM D-790).

As used herein an "elastomer" is a material which experiences large reversible deformation under relatively low stress. Elastomers are typically characterized as having structural irregularities, non-polar structures, or flexible units in the polymer chain. An elastomeric polymer may, for example, be stretched to at least twice its relaxed length with stress and after release of the stress returns to approximately the original dimensions and shape. Nonlimiting examples of suitable elastomers include natural rubber, polyolefin elastomers (POE), chlorinated polyethylene (CPE), silicone rubber, styrene/butadiene (SB) copolymers, styrene/butadiene/styrene (SBS) terpolymers, styrene/ethylene/butadiene/styrene (SEBS) terpolymers and hydrogenated SBS or SEBS.

In an embodiment, the elastomer is a polyolefin elastomer. A polyolefin elastomer includes one or more $C_2$ to $C_{20}$ α-olefins in polymerized form, having a glass transition temperature ($T_g$) of less than 25° C., preferably less than 0° C. $T_g$ is the temperature or temperature range at which a polymeric material shows an abrupt change in its physical properties, including, for example, mechanical strength. $T_g$ can be determined by differential scanning calorimetry. Exemplary polyolefin elastomers include, but are not limited to, ethylene/α-olefin copolymers and terpolymers and block copolymers, ethylene-propylene diene rubbers, propylene-α-olefin copolymers, silicon rubbers, butadiene-based rubber and the like. Polyolefin elastomer may, for example, include ethylene/α-olefin copolymers, made with single-site or metallocene catalysts, wherein the units within the polyolefin elastomer derived from ethylene are greater than 50 percent by weight.

In an embodiment, the ethylene/α-olefin polyolefin may include ethylene and an α-olefin comonomer having from 4 to 20 carbon atoms, or any number of carbon atoms therebetween. Exemplary α-olefins include, but are not limited to, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene. The elastomer component may have a density in the range of 0.855 to 0.980 g/cm$^3$. In a further embodiment, the elastomer is an ethylene/octene copolymer.

In an embodiment, the polymeric composition contains from about 75% to about 95% percent by weight, or about 80% by weight, clarified random propylene/ethylene copolymer and from about 5% to about 25% by weight, or about 20% by weight elastomer.

In an embodiment, the coupling agent is a component of a molecular melt. As used herein, a "molecular melt" is a blend of a coupling agent and an antioxidant, optionally also containing other polymer additives. The coupling agent and the antioxidant form a complex where the Raman spectra relating to the groups forming the nitrene groups are shifted compared to the Raman spectra exhibited by the groups forming the nitrene groups of the coupling agent alone.

The term "antioxidant," as used herein, refers to types or classes of chemical compounds that are capable of being used to minimize the oxidation that can occur during the processing of polymers. The term antioxidant also includes chemical derivatives of the antioxidants, including hydrocarbyls. The term antioxidant further includes chemical compounds, which when properly combined with the coupling agent, interact therewith to form a complex that exhibits a modified Raman spectra compared to the coupling agent alone. Preferably, the antioxidant is not a phosphite-containing compound or a compound containing a phosphorous in the +3 oxidation state. A nonlimiting example of a phosphite-based antioxidant is tris(2,4-di-tert-butylphenyl)phosphite, commercially available from Ciba Specialty Chemicals Company under the trade name Irgafos® 168.

Exemplary classes of antioxidants include, but are not limited to, compounds that can function as either carbon radical and/or oxygen radical scavengers, such as, phenolic compounds and derivatives thereof, hindered amines, amine hydroxides, thioester compounds, and hindered phenolic compounds. Additionally, lactones may be used an antioxidant. The molecular melt may contain one or more antioxidants.

Exemplary phenolic-based antioxidants and substituted phenolic-based antioxidants include, but are not limited to, 2,2'-methylene bis(6-(1-methylcyclohexyl)-p-cresol and 2,6-ditertiary butyl-4-methyl phenol.

Exemplary hindered phenolic compounds include, but are not limited to, 3,5-di-tert-butyl-4-hydroxy hydrocinnamate, commercially available from Ciba Specialty Chemicals Company, under the trade name Irganox® 1010.

Exemplary lactones include, but are not limited to, 5,7-bis (1,1-dimethylethyl)-3-hydroxy-2(3H)-benzofuranone reaction products with o-xylene, commercially available from Ciba Specialty Chemicals Company, under the trade name Irganox® HP-136.

In an embodiment, at least a portion of the coupling agent and an antioxidant present in the molecular melt form a complex, which does not adversely interfere with the utilization of the coupling agent for modifying polymers. The mole ratio of coupling agent to antioxidant in the molecular melt may be from 1:10 to 10:1. All individual values and subranges from 1:10 to 10:1 are included herein and disclosed herein. For example, the mole ratio of coupling agent to antioxidant may be from 1:2 to 8:1; or the mole ratio of coupling agent to antioxidant may be from 1:1 to 4:1. The molecular melt may include less than 99 percent by weight of the coupling agent, based on the weight of the molecular melt. All individual values and subranges less than 99 weight percent are included herein and disclosed herein. For example, the molecular melt may include less than 75 percent by weight of the coupling agent, based on the weight of the molecular melt, the molecular melt may include less than 50 percent by weight of the coupling agent, based on the weight of the molecular melt, or the molecular melt may include less than 35 percent by weight of the coupling agent, based on the weight of the molecular melt, or the molecular melt may include less than 25 percent by weight of the coupling agent, based on the weight of the molecular melt. The molecular melt may include at least 1 percent by weight of the antioxidant, based on the weight of the molecular melt. All individual values and subranges of at least 1 weight percent are included herein. For example, the molecular melt may include at least 25 percent by weight of the antioxidant, based on the weight of the molecular melt, or the molecular melt may comprise at least 50 percent by weight of the antioxidant, based on the weight of the molecular melt, or the molecular melt may include at least 65 percent by weight of the antioxidant, based on the weight of the molecular melt, or the molecular melt may include at least 75 percent by weight of the antioxidant, based on the weight of the molecular melt.

The molecular melt may be formed by melt blending the coupling agent and antioxidant, by co-precipitating the coupling agent and antioxidant from a common solvent, or any other conventional method. The molecular melt may be formed into any convenient form, i.e., solid or liquid.

Other compounds, in addition to the coupling agent and antioxidant, may optionally be present in the molecular melt. The additional compounds do not adversely react with either the coupling agent or the antioxidant and will not cause the crystallinity of the molecular melt to rise significantly.

It may be necessary to activate a coupling agent with heat, sonic energy, radiation, or other chemical activating energy, for the coupling agent to be effective for coupling polymer chains. The coupling reaction may occur in any equipment that provides sufficient mixing and temperature control including such nonlimiting examples as a solvent-based medium, an extruder, a melt mixer, a pump conveyor or other polymer mixing device such as a Brabender melt mixer. In an embodiment, the coupling reaction takes place an extruder. An "extruder," as used herein, is a device which extrudes pellets or sheets/films and has one or more sequence(s) of temperature zones. The extruder may be a single barrier or a multiple barrier extruder.

In an embodiment, the extruder provides sufficient heat and mixing to perform the coupling reaction at the softening temperature of the random propylene copolymer and, before there is sufficient heat to raise the mass of the polymer to the peak decomposition temperature of the poly(sulfonyl azide).

In an embodiment, the coupling reaction is implemented via reactive melt blending. Reactive melt blending includes, but is not limited to, an extrusion process or any other method which is capable of mixing the clarified random propylene and α-olefin copolymer and the coupling agent and adding sufficient energy to cause a coupling reaction between the coupling agent and the clarified random propylene/α-olefin copolymer. In a further embodiment, from about 100 ppm to about 500 ppm of a bis(sulfonyl azide) (BSA) coupling agent is reactive melt blended with Dow 6D83K to form the reaction product. In yet a further embodiment, the amount of bis(sulfonyl azide) is from about 0.01 to about 0.1 weight percent, or from about 0.02 to about 0.06 weight percent of bis(sulfonyl azide) based on total weight of the composition.

Other components which may be optionally included in the coupling reaction include an elastomer, an antioxidant, and a filler. The reactive blending process may be carried out in a single vessel such as a melt mixer, (e.g., Brabender, Banbury, or Farrell Continuous Mixer) or a polymer extruder. The coupling reaction forms (i) a coupled clarified random propylene/α-olefin copolymer or (ii) a coupled clarified random propylene/α-olefin copolymer and elastomer as discussed above.

Adjusting the amount of coupling agent correspondingly adjusts the MFR for the polymeric composition. Table 2 below shows the relationship between the amount of coupling agent (i.e., azide content) and MFR for the polymer composition.

TABLE 2

| Sample # (Dow 6D83K) | BSA (ppm) | MFR (g/10 min @ 230° C./2.16 kg) |
|---|---|---|
| A | 0 | 1.90 |
| B | 238 | 1.50 |
| C | 333 | 1.00 |
| D | 393 | 0.75 |
| E | 452 | 0.50 |

Table 3 provides an example of a polymeric composition composed of the reaction product of Dow 6D83K, elastomer, and the coupling agent. The data in this table demonstrate that the coupled product has significantly improved low temperature impact performance with little, or no, degradation in performance of either haze or modulus.

TABLE 3

| Dow 6D83K (wt %) | Affinity PL 1880 (wt %) | Irgafos 168 (wt %) | BSA (ppm) | MFR (g/10 min @ 230° C./2.16 kg) | Haze (40 mm plaque) | Sec Modulus (1% strain), (kpsi) | Notched Izod Impact, RT (ft-lb/in) | Notched Izod Impact, 0° C. (ft-lb/in) |
| --- | --- | --- | --- | --- | --- | --- | --- | --- |
| 79.98 | 20 | 0.02 | 0 | 2.3 | 12.8 | 110 | 13.0 | 7.0 |
| 79.98 | 20 | 0.02 | 150 | 1.5 | 13.5 | 96 | 14.7 | 11.0 |

Affinity PL 1880 = ethylene-octene copolymer
BSA = bis (sulfonyl azide)
wt % = based on total weight of polymeric composition Any of the foregoing polymeric compositions may be used as a gloss resin in an extrusion process and/or thermoforming process as will be discussed in detail below.

In an embodiment, the present disclosure provides a multiple layer structure. The multiple layer structure includes a base layer and a cap layer. The base layer (or substrate) may or may not contact the cap layer. As used herein, "contact" is the act or the condition of touching, interfacing, and/or meeting. In an embodiment, the base layer "directly contacts" the cap layer, so that at least a portion of the base layer physically touches or directly interfaces with at least a portion of the cap layer with no intervening layers and/or no intervening structures between the base layer and the cap layer. In another embodiment, one or more intervening layers may be located or otherwise disposed between the base layer and the cap layer.

The base layer is a thermoplastic polyolefin (TPO). The TPO may be a single component or a blend of two or more components. In an embodiment, the TPO is a blend and is composed of (i) a coupled impact propylene copolymer and (ii) an elastomer. The impact propylene copolymer may have a density of about 0.900 g/cc and a melt flow rate of 0.50 (230° C./2.16 kg, ASTM 1238). The elastomer may be an ethylene-propylene copolymer with a density of about 0.875 g/cc (ASTM D 792) and a melt flow rate of 2.9 g/10 min (190° C./10 kg, ASTM 1238). A nonlimiting example of a suitable TPO is D 500 Developmental Performance Polymer available from The Dow Chemical Company, Midland, Mich. The TPO may or may not include a filler. In an embodiment, the base layer includes a pigment.

In an embodiment, the TPO is a blend of a polypropylene homopolymer, elastomer, and a filler (and optionally a nucleating agent and/or a coupling agent).

The cap layer is composed of a gloss resin, the gloss resin being any of the foregoing polymeric compositions. In an embodiment, the cap layer is composed of the reaction product of the clarified random propylene/α-olefin copolymer and a coupling agent as previously disclosed (i.e., the coupled clarified random propylene/α-olefin copolymer). The cap layer provides a desired finish to the multiple layer structure. The cap layer may or may not include a pigment.

In an embodiment, the multiple layer structure includes a third layer. The third layer may be in direct contact with the cap layer and/or the base layer. In an embodiment, the third layer is located between the cap layer and the base layer. The base layer may or may not be the innermost layer. The cap layer may or may not be the outermost layer. The third layer may have the same composition as the cap layer (i.e., the reaction product of the clarified random propylene and α-olefin copolymer and the coupling agent). The third layer may include a pigment to color the third layer/multiple layer structure as desired. In a further embodiment, any combination of the cap layer, the base layer, or the third layer may contain a pigment. The pigment in each layer may be the same or different as desired.

Any of the foregoing multiple layered structures may be extruded, coextruded or otherwise formed into a film or a sheet. Similarly, any individual layer (cap layer and/or base layer) may be extruded or formed into a film or a sheet. As used herein, a "sheet" is an extruded (or coextruded) structure having a thickness greater than about 0.015 inch. A "film" is an extruded (or coextruded) structure having a thickness less than about 0.015 inch. It is understood that disclosure directed to a sheet may apply equally to film structures. The film/sheet may be thermoformed into a finished thermoformed article.

In many thermoforming manufacturing processes, as much as 40%-60% by weight of a thermoplastic sheet may be lost as scrap. As used herein, "scrap" or "scrap material" is any of the foregoing multiple layer structures (i.e., a film or a sheet) (i) that has been subjected to a thermoforming operation and (ii) is not incorporated into a final thermoformed product. Scrap is produced from trim, edge, or other excess material that is cut or removed from an extruded or a thermoformed sheet, and/or a finished thermoformed article/product. Once collected, the scrap material can be ground for further recycling or for other purposes. As used herein, "regrind" is ground scrap material. A "virgin" material or a "virgin thermoplastic polyolefin" is a material or TPO that has not been subjected to a thermoforming and/or an extrusion operation.

The ability to recycle scrap is beneficial to economic and production efficiencies. It is difficult, however, to produce thermoformed articles that contain TPO scrap material. Recycled TPO alone or blended with virgin TPO typically exhibits an increased sag rate compared to virgin TPO. Several factors can contribute to the increase of sag rate for recycled TPO. During thermoforming, for example, the cap layer and/or the base layer of the multiple layer structure undergo thermal degradation. The thermal degradation causes an increase in MFR for one or both layers of the multiple layer structure. In addition, conventional cap layers tend to have a high MFR (compared to TPOs) and a low viscosity thereby increasing the sag rate of recycled cap layer-containing scrap material.

The present disclosure provides a method whereby a capped TPO sheet may be recycled into a thermoforming process without adversely affecting the properties of a thermoformed sheet and/or a finished thermoformed article. In an embodiment, a method for producing a sheet is provided. The method includes blending a virgin thermoplastic polyolefin with a multiple layer structure to form a recycled sheet. The multiple layer structure has a base layer and a cap layer composed of the gloss resin. The multiple layer structure can be any multiple layer structure disclosed herein. The gloss resin can be any gloss resin disclosed herein. The virgin thermoplastic polyolefin has a sag rate, denoted $SR_V$. The recycled sheet has a sag rate denoted $SR_R$. The method includes adjusting the melt flow rate of the gloss resin so that the recycled sheet has a sag resistance index (SRI) less than or equal to 1.5, wherein $$SRI = \frac{SR_R}{SR_V}$$

As used herein, the "sag rate" is the time (in seconds) it takes for a heated thermoplastic sheet to droop (by way of gravity) a chosen distance. For purposes of this disclosure, the sag rate is based on a 25 inch×35 inch thermoplastic sheet having a thickness of 187 mils, the sheet being heated from ambient at a heat rate of 2.2° F./second. The "chosen distance" is the distance between a first position that is 3.25 inches below the clamp frame of the thermoformer and a second position that is 5.88 inches below the clamp frame. Thus, the "chosen distance" is 2.63 inches. A detection device is located at the first position. The sheet is heated at 2.2° F./second while in the clamp frame. Upon heating, the center of the sheet begins to droop. Once the lowermost portion of the drooping sheet passes a detector at the first position, determination of sag rate commences with initiation of a timer. With continued heating at the heat rate of 2.2° F./second, the sheet continues to droop. The time it takes the lowermost portion of the heated sheet to reach the second position (i.e., 5.88 inches below the clamp frame) is then measured. This is the "travel time." The sag rate (inches/second) for the sheet is calculated as follows.

$$\text{Sag rate} = \frac{2.63 \text{ inches}}{\text{travel time (seconds)}}$$

Accordingly, "$SR_V$" is the sag rate for a sheet of virgin TPO and "$SR_R$" is the sag rate for a recycled sheet containing an amount of scrap material.

As used herein, the "sag resistance index" ("SRI") is an index to determine the processability of the recycled sheet and is defined as follows.

$$SRI = \frac{SR_R}{SR_V}$$

It has been unexpectedly and surprisingly discovered that a recycled sheet with an SRI less than or equal to 1.5 provides process properties similar to, or substantially similar to, a virgin thermoplastic sheet. A recycled sheet with an SRI less than or equal to 1.5 also yields a thermoformed product with properties, durability, and/or structural integrity similar to, or substantially similar to, a thermoformed product made from solely virgin TPO.

The method includes blending the virgin TPO with a multiple layer structure to form a recycled sheet. The blending may include grinding, re-grinding, melting, re-melting, melt blending (or any combination thereof) the virgin TPO and/or the multiple layer structure. The multiple layer structure has a cap layer composed of a gloss resin and a base layer composed of thermoplastic polyolefin. The gloss resin may be any of the foregoing polymeric compositions as previously discussed herein. Any of the foregoing multiple layer structures may be blended with the virgin TPO. The multiple layer structure may be a film, a sheet, pieces thereof, and/or combinations thereof. In an embodiment, the multiple layer structure is a sheet, pieces of which are collected as scrap from a previous thermoforming or sheetmaking process to be blended with the virgin TPO.

In an embodiment, the virgin TPO is blended or otherwise mixed with the multiple layer sheet (which may be scrap material) by way of melt-blending. Melt-blending includes contacting the virgin TPO and the multiple layer sheet (i.e., the scrap material) and thereafter heating to a temperature at which each is molten. Alternatively, melt-blending may occur by way of individually heating the virgin TPO and the multiple layer sheet to respective temperatures at which each is molten. The molten components are then combined, contacted, and mixed with each other.

The method also includes adjusting the melt flow rate of the gloss resin. Adjustment of the gloss resin melt flow rate occurs before the virgin TPO is blended with the multiple layer structure. In an embodiment, the melt flow rate of the gloss resin can be adjusted before, during, or after formation of the virgin TPO. The melt flow rate of the gloss resin is adjusted so that the SRI value is less than or equal to about 1.5. Adjustment may include increasing or decreasing the melt flow rate of the gloss resin. In an embodiment, the melt flow rate of the gloss resin is adjusted to maintain the SRI value from about 0.5 to less than or equal to about 1.5, or from about 0.7 to less than or equal to about 1.4, or from about 1.0 to less than or equal to about 1.2.

The gloss resin may be any of the foregoing polymeric compositions. In an embodiment, the gloss resin is composed of a clarified random propylene/α-olefin copolymer. Adjustment of the melt flow rate includes coupling the clarified propylene/α-olefin copolymer to decrease the melt flow rate of the gloss resin. The coupling reaction is performed with a coupling agent as discussed above.

In another embodiment, the gloss resin includes a clarified random propylene/α-olefin copolymer and an elastomer. The method includes coupling the clarified random propylene/α-olefin copolymer and the elastomer to decrease the melt flow rate of the gloss resin. The coupling reaction is performed with a coupling agent as discussed above.

Decreasing the melt flow rate of the gloss resin reduces the dilution effect imparted by the gloss resin when blended with the TPO. By diminishing the dilution effect, the presence of the gloss resin in the recycled composition does not adversely affect the sag rate of the TPO.

In an embodiment, the melt flow rate ("MFR") of the gloss resin is decreased to less than 2.0 g/10 min, or from about 0.1 g/10 min to less than 1.9 g/10 min, or from about 0.5 g/10 min to about 1.5 g/10 min. The melt flow rate is measured in accordance with ASTM D-1238, 2.16 kg at 230° C. Decreasing the gloss resin MFR decreases the value for $SR_R$. The lower the value is for $SR_R$, the lower is the SRI value.

In an embodiment, the amount of multiple layer structure added or otherwise combined to the blend is adjusted to maintain the SRI value at less than or equal to about 1.5. Pieces of the multiple layer structure can be collected as scrap material which is reground and melt blended with the virgin TPO. The method can include adding from about 40 wt % to about 60 wt % of the virgin thermoplastic polyolefin with from about 60 wt % to about 40 wt % of the multiple layer structure to form the recycled sheet.

In an embodiment, the amount of multiple layer structure added or otherwise combined with the virgin TPO is adjusted to provide or otherwise form a recycled sheet having from about 5 wt % to about 15 wt % of the gloss resin, based on the weight of the recycled sheet. In a further embodiment, the method includes forming the recycled sheet to contain from about 5 wt % to about 10 wt %, or about 8.5 wt % of the gloss resin.

In an embodiment, the method includes collecting a scrap material and blending the scrap material with the virgin TPO to form the recycled sheet. The scrap material can be ground prior to blending. The blending can be melt blending and/or extrusion blending as discussed above. The scrap material is one or more pieces of the multiple layer structure collected from a previous thermoforming operation. In an embodiment, the multiple layer structure has a first layer that is composed of a gloss resin and a second layer composed of TPO.

In an embodiment, the method includes thermoforming the recycled sheet into an article. Adjustment of the gloss resin melt flow rate to maintain an SRI value less than or equal to 1.5 surprisingly and unexpectedly enables the incorporation of recycled scrap material into a finished thermoformed article without adverse impact to structure and/or properties of the finished thermoformed article. In addition, the present method advantageously reduces the need to discard scrap, thereby increasing production efficiency. Nonlimiting examples of suitable articles made from the thermoformed recycled sheet include fender skirts, covers, trim pieces, housings, hoods, and automotive parts.

The above method for recycling scrap material into a thermoforming operation produces a multiple layer sheet. In an embodiment, the multiple layer sheet includes a base layer and a cap layer. The base layer is a blend of (i) the virgin thermoplastic polyolefin and (ii) the multiple layer structure. The multiple layer structure has a first layer (i.e., a cap layer) composed of the gloss resin and a second layer (i.e., a base layer) composed of TPO. The virgin TPO and the multiple layer structure can be melt blended and/or extrusion blended as disclosed above. In an embodiment, the multiple layer structure is one or more pieces of scrap material. The scrap material is (melt) blended with the virgin TPO. Thus, the base layer is a composed of recycled material.

The multiple layer sheet also includes a cap layer in contact with the base layer. The cap layer is composed of gloss resin that is a reaction product of a clarified random propylene/α-olefin copolymer and a coupling agent. The cap layer has a Gardner gloss at 60° of greater than 60 as measured in accordance with ASTM D-523. The gloss resin in the base layer and the gloss resin in the cap layer can be the same or different. The gloss resin can be any gloss resin as disclosed herein. In an embodiment, the gloss resin in the base layer is the same as the gloss resin in the cap layer.

In an embodiment, the base layer comprises from about 90 wt % to about 95 wt % of thermoplastic polyolefin. The virgin TPO and the TPO in the multiple layer structure can be the same or different. The virgin TPO combined with the TPO present in the multiple layer structure amount to from about 90 wt % to about 95 wt % of the base layer. In another embodiment, the virgin TPO and the TPO in the multiple layer structure are each D500.

In an embodiment, the base layer is composed of from about 40 wt % to about 60 wt % of the virgin thermoplastic polyolefin. This is based on the weight of the base layer.

In an embodiment, the base layer contains about 5 wt % to about 15 wt % of the gloss resin. This is based on the weight of the base layer.

In an embodiment, the melt flow rate of the gloss resin present in the base layer and/or the cap layer is from about 0.5 g/10 minutes to about 2.0 g/10 minutes as measured in accordance with ASTM D-1238, 2.16 kg at 230° C.

Nonlimiting examples of embodiments of the present disclosure are provided below.

The following embodiments are provided as specific enablement for the claims:

1. A method for producing a sheet comprising the steps of blending a virgin thermoplastic polyolefin with a sag rate $SR_V$ with a multiple layer structure to form a recycled sheet with a sag rate $SR_R$, the multiple layer structure having a base layer and a cap layer comprising a gloss resin; and adjusting a melt flow rate of the gloss resin so that the recycled sheet has a sag resistance index (SRI) less than or equal to about 1.5, wherein $$SRI = \frac{SR_R}{SR_V}$$

2. The method of embodiment 1 comprising decreasing the melt flow rate of the gloss resin.

3. The method of any of the preceding embodiments wherein the adjusting occurs before the blending.

4. The method of any of the preceding embodiments comprising decreasing the melt flow rate of the gloss resin and maintaining the SRI to less than or equal to about 1.2.

5. The method of any of the preceding embodiments wherein the gloss resin comprises a clarified random propylene/α-olefin copolymer, the method comprising coupling the clarified random propylene/α-olefin copolymer.

6. The method of any of the preceding embodiments wherein the gloss resin comprises a clarified random propylene/α-olefin copolymer and an elastomer, the method comprising coupling the clarified random propylene/α-olefin copolymer and the elastomer.

7. The method of any of the preceding embodiments comprising decreasing the melt flow rate of the gloss resin to less than 2.0 g/10 min.

8. The method of any of the preceding embodiments comprising adding from about 40 wt % to about 60 wt % of the virgin thermoplastic polyolefin to from about 60 wt % to about 40 wt % of the multiple layer structure to form the recycled sheet.

9. The method of any of the preceding embodiments comprising forming a recycled sheet comprising from about 5 wt % to about 15 wt % of the gloss resin.

10. The method of any of the preceding embodiments comprising collecting, before the blending, a scrap material comprising the multiple layer structure 11. The method of any of the preceding embodiments comprising, thermoforming the recycled sheet into an article.

12. The method of any of the preceding embodiments comprising melt blending the virgin thermoplastic polyolefin and the multiple layer structure.

13. A polymeric composition is provided and comprises a reaction product of a clarified random propylene/α-olefin copolymer and a coupling agent; and the composition has a Gardner gloss at 60° of greater than 60 as measured in accordance with ASTM D-523.

14. The composition of embodiment 13 wherein the composition has a Gardner gloss at 60° of greater than 80.

15. The composition of any of embodiments 13-14 wherein the composition has a melt flow rate from about 0.1 g/10 min to about 2.0 g/10 min as measured in accordance with ASTM D-1238, 2.16 kg at 230° C.

16. The composition of any of embodiments 13-15 wherein the composition has less than 20% haze as measured in accordance with ASTM D-1003.

17. The composition of any of embodiments 13-16 wherein the propylene/α-olefin copolymer comprises less than 6% by weight ethylene copolymer.

18. The composition of any of embodiments 13-17 wherein the coupling agent is a bis(sulfonyl azide).

19. The composition of any of embodiments 13-18 wherein the composition has a flexural modulus from about 100 kpsi to about 200 kpsi as measured in accordance with ASTM D-790.

20. The composition of any of embodiments 13-19 wherein the composition has and a notched Izod impact strength at 23° C. from about 3 ft-lb/in to about 14 ft-lb/in as measured in accordance with ASTM D-256.

21. The composition of any of embodiments 13-20 wherein the reaction product comprises the clarified random propylene/α-olefin copolymer, an elastomer and the coupling agent.
22. The composition of the preceding embodiment wherein the elastomer is an ethylene/α-olefin copolymer.
23. The composition of embodiment 21 having a melt flow rate from about 1.0 g/10 min to about 2.0 g/10 min as measured in accordance with ASTM D-1238, 2.16 kg at 230° C.
24. The composition of embodiment 21 having a notched Izod impact strength at 23° C. from about 10 ft-lb/in to about 20 ft-lb/in as measured in accordance with ASTM D-256.
25. The composition of embodiment 21 having an average flexural modulus from about 90 kpsi to about 100 kpsi as measured in accordance with ASTM D-790.
26. A multiple layer sheet is provided and comprises a base layer comprising a thermoplastic polyolefin; a cap layer in contact with the base layer, the cap layer comprising a reaction product of a clarified random propylene/α-olefin copolymer and a coupling agent, the cap layer having a Gardner gloss at 60° of greater than 60 as measured in accordance with ASTM D-523.
27. The multiple layer sheet of the previous embodiment wherein the cap layer has a Gardner gloss at 60° greater than 80.
28. The multiple layer sheet of any of embodiments 26-27 wherein the thermoplastic polyolefin comprises a blend of (i) a propylene impact copolymer and (ii) an elastomer.
29. The multiple layer sheet of any of embodiments 26-28 wherein the cap layer comprises a reaction product of a clarified random propylene/α-olefin copolymer, an elastomer, and a coupling agent.
30. A multiple layer sheet is provided and comprises a base layer comprising a blend of (i) a virgin thermoplastic polyolefin and (ii) a multiple layer structure having a first layer comprising a gloss resin and a second layer comprising a thermoplastic polyolefin; and a cap layer is in contact with the base layer, the cap layer comprising a reaction product of a clarified random propylene/α-olefin copolymer and a coupling agent, the cap layer having a Gardner gloss at 60° of greater than 60 as measured in accordance with ASTM D-523.
31. The multiple layer sheet of the previous embodiment wherein the gloss resin comprises the reaction product.
32. The multiple layer sheet of any of embodiments 30-31 wherein the base layer comprises from about 90 wt % to about 95 wt % of thermoplastic polyolefin.
33. The multiple layer sheet of any of embodiments 30-32 wherein the base layer comprises from about 40 wt % to about 60 wt % of the virgin thermoplastic polyolefin.
34. The multiple layer sheet of any of embodiments 30-33 wherein the base layer comprises from about 5 wt % to about 15 wt % of the gloss resin.
35. The multiple layer sheet of any of embodiments 30-34 wherein the melt flow rate of the gloss resin is from about 0.5 g/10 minutes to about 2.0 g/10 minutes as measured in accordance with ASTM D-1238, 2.16 kg at 230° C.

By way of example and not limitation, examples of the present disclosure will now be given.

EXAMPLES

Example 1

Multiple layer polymeric sheets having a size of 25 inches wide and 35 inches long were coextruded having the following structure:

| Base layer | 0.168 inches thick |
|---|---|
| Cap layer | 0.019 inches thick |

The 0.168 inch thick TPO base layer (Developmental Performance Polymer D 500) is coextruded with 0.019 inch thick cap layers composed of gloss resin from each of the examples as shown in Table 4. The sheet samples are subsequently thermoformed on an AVT shuttle thermoformer. Each sheet is placed in a clamp frame of the AVT thermoformer, and rigidly clamped on all four sides. Next, the clamped sheet is indexed into the heat station of the AVT thermoformer, where the sheet is heated by ceramic infrared radiant heaters at 2.2° F./second.

The sag rate, as noted in Tables 4 and 5, refers to the time in seconds it takes for a heated sheet to sag a chosen distance. The "chosen distance" is the vertical distance between a first position that is 3.25 inches below the clamp frame and a second position that is 5.88 inches below the clamp frame. Thus, the "chosen distance" is 2.63 inches. A detection device is located at the first position. The sheet is heated at 2.2° F./second while in the clamp frame. Upon heating, the center of the sheet begins to droop. Once the lowermost portion of the drooping sheet passes a detector at the first position, determination of sag rate commences with initiation of a timer. With continued heating at the heat rate of 2.2° F./second, the sheet continues to droop. The time it takes the lowermost portion of the heated sheet to reach the second position (i.e., 5.88 inches below the first position) is then measured. This is the "travel time." The sag rate for the sheet is calculated as follows.

$$\text{Sag rate} = \frac{2.63 \text{ inches}}{\text{travel time (seconds)}}$$

For the experiments reported in Tables 4 and 5, the sag rate is the time for the sheet to sag from 3.25 inches below the clamp frame to 5.88 inches below the clamp frame. The sag rate is measured by a light curtain in the oven. The sag rate is the vertical distance traveled divided by the time. The heat rate is determined by measuring the final temperature of the sheet after it is heated in the oven divided by the time required to heat to the final sheet temperature. Once the sheet reaches a pre-determined sag of approximately 5.88 inches below the clamp frame, the sheet is removed from the oven. A vacuum box is raised to contact the sheet and vacuum applied to pre-stretch the sheet. Next, a male mold is inserted into the sheet and vacuum applied to the tool and released from the vacuum box to allow the sheet to be drawn onto the tool. The sheet is cooled and the part is removed from the tool. Gloss of the sheet prior to forming and of the thermoformed parts is measured using a BYK Gardner Gloss meter.

Table 4 below shows gloss values and sag rate values for multiple layer structures in accordance with embodiments of the present disclosure. Table 4 illustrates that the sheet gloss is relatively independent of the MFR of the cap material. Also, the sag rate of the structure is independent of the MFR of the cap material. In other words the sag rate of the structure is controlled by the sag rate of the substrate layer (which is about 90 wt % of the multiple layer structure).

TABLE 4

Virgin substrate, no recycle

| Sample ID | Substrate Material | Cap Material (Table 2) | Cap Layer MFR* (g/10 min @ 230° C./ 2.16 kg) | Substrate Thickness (mils) | Average Sheet Gloss ASTM D-523(%) | Average Surface Temp. (° F.) | Average Heat Rate (° F./s) | Average Sag Rate (in/s) |
|---|---|---|---|---|---|---|---|---|
| Control | D500 | None | N/A | 187 | N/A | 479 | 2.2 | 0.045 |
| 1 | D500 | A | 1.90 | 168 | 90.1 | 476 | 2.2 | 0.045 |
| 2 | D500 | B | 1.50 | 168 | 92.9 | 477 | 2.2 | 0.044 |
| 3 | D500 | C | 1.00 | 168 | 92.1 | 478 | 2.2 | 0.044 |
| 4 | D500 | D | 0.75 | 168 | 89.5 | 479 | 2.2 | 0.042 |
| 5 | D500 | E | 0.50 | 168 | 84.3 | 480 | 2.2 | 0.043 |

Cap layers B, C, D and E are Dow 6D83K coupled with different levels of BSA coupling agent.
D500 = D 500 Developmental Performance Polymer
Substrate layer (base layer) = 100 wt % D500
Cap layer = virgin gloss resin, 19 mils thickness Table 4 illustrates the relative invariance of sag rate when the MFR of the cap (gloss) layer is changed over a relatively wide range. The situation is different when amounts of regrind are added to the substrate layer. In particular, the sag rate for the substrate layer increases due to the presence of regrind therein. The thermoformability of the resulting regrind-containing sheet deteriorates.

There are several factors that contribute to the increase of sag rate for samples containing regrind. Sag rate increases with increasing MFR and the MFR of the regrind-containing substrate is higher than the MFR of the virgin substrate for one or more of the following reasons.
1. The MFR of the virgin cap layer (MFR 1.9) is higher than the MFR of the virgin substrate (MFR about 0.5).
2. Thermal degradation of the cap layer during the extrusion (sheet making and subsequent thermoforming) processes further increases the MFR of the cap layer to be used in the regrind.
3. Thermal degradation of the substrate layer during the extrusion (sheet making and subsequent thermoforming) processes further increases the MFR of the substrate layer to be used in the regrind.

As the sag rate of the recycled sheet increases the SRI increases. Improved thermoforming performance is indicated by recycled sheets with SRI values at or near 1.0.

Commercial thermoforming operations generate up to 40-60% multilayer sheet scrap material that does not end up in the finished part. It is desirable to recycle this scrap material. When possible, scrap material is processed to form regrind, the regrind being blended or melt blended with virgin TPO substrate to form a recycled sheet. The recycled sheet is used as a substrate layer and is capped with a cap layer of virgin gloss resin. In a continuous operation, the recycled substrate sheet can contain up to about 60 wt % regrind. At steady state (assuming 50% recycle level) the recycled substrate layer contains about 8% cap layer.

Table 5 shows sag rate and SRI for samples containing up to 8.5 wt % cap layer in the recycled substrate. The SRI is as high as 1.64 for samples containing untreated cap layer. However, as the melt flow rate of the cap layer is decreased, the SRI value decreases.

Table 5 illustrates that a significant contributor to deterioration of thermoforming properties is the amount of cap layer present in the recycled substrate. In samples 1, 3 and 5 of Table 5, the regrind substrate type is identical and is present in the same amount in all samples, yet the SRI values are very different. SRI values of the virgin sheets in samples 3 and 5 are within about 10% of the SRI of sample 1 virgin sheet.

Table 5 demonstrates that decreasing the melt flow rate of the cap layer reduces the SRI value of about 1.6 for an untreated cap layer to about 1.3 for a low MFR cap layer. This translates roughly into a 25% improvement in sheet sag variability in the oven. It has been surprisingly and unexpectedly found that maintaining the SRI less than or equal to 1.5 ensures that a recycled sheet will perform the same as, or substantially the same as, a virgin sheet during the thermoforming operation.

TABLE 5

| Sample ID | Cap Layer Material | Cap Layer MFR (g/10 min @ 230° C./ 2.16 kg) | Amount of TPO in Base Layer (wt %) | Amount of Cap Material in Base Layer (wt %) | Base Layer Thickness (mils) | Cap Layer Composition | Cap Layer Thickness (mils) | Average Sag Rate** (in/s) | Sag rate index (SRI)* - Based on Sample 1 | Average Sheet Temperature (° F.) |
|---|---|---|---|---|---|---|---|---|---|---|
| 5-1 | Sample 1 from Table 4 | 1.9 | 100 | 0 | 168 | Virgin | 19 | 0.050 | 0.847 | 468 |
| 5-1-recycle | Sample 1 from Table 4 | 1.9 | 91.5 | 8.5 | 168 | Virgin | 19 | 0.082 | 1.64 | 443 |
| 5-3 | Sample 3 from Table 4 | 1.0 | 100 | 0 | 168 | Virgin | 19 | 0.048 | 0.96 | 469 |
| 5-3-recycle | Sample 3 from Table 4 | 1.0 | 91.5 | 8.5 | 168 | Virgin | 19 | 0.075 | 1.5 | 447 |

TABLE 5-continued

| Sample ID | Cap Layer Material | Cap Layer MFR (g/10 min @ 230° C./ 2.16 kg) | Amount of TPO in Base Layer (wt %) | Amount of Cap Material in Base Layer (wt %) | Base Layer Thickness (mils) | Cap Layer Composition | Cap Layer Thickness (mils) | Average Sag Rate** (in/s) | Sag rate index (SRI)* - Based on Sample 1 | Average Sheet Temperature (° F.) |
|---|---|---|---|---|---|---|---|---|---|---|
| 5-5 | Sample 5 from Table 4 | 0.5 | 100 | 0 | 168 | Virgin | 19 | 0.045 | 0.9 | 473 |
| 5-5-recycle | Sample 5 from Table 4 | 0.5 | 91.5 | 8.5 | 168 | Virgin | 19 | 0.065 | 1.3 | 453 |

**At heat rate of 2.2° F./s
*SRI = Recycle sheet sag rate(SR$_r$)/Virgin sheet sag rate (SR$_v$)
The multiple layer structures each have a base layer and a cap layer.
Base layer for each sample includes D 500 Developmental Performance Polymer, a TPO
Recycle simulated by pellet blending D 500 Developmental Performance Polymer and the various cap layer materials and extruding in the base layer.

Table 6 provides comparative physical property data for multi-layered sheets—virgin sheets and sheets containing recycle for samples using conventional cap layer and low MFR cap layer. Table 7 provides impact and thermal properties for the same set of samples.

Table 6 demonstrates that physical properties of the composite sheet are very similar for sheets using unmodified Dow 6D83K cap layer and low MFR cap layer—whether containing or not containing regrind.

TABLE 6

Cap Layer and Recycle Sheet Physical Property Data

| Sample ID | ASTM Test Method | Units | Commercial[1] | Commercial with Commercial recycle | 5-5[1] (Table 5) | 5-5[1]-recycle (Table 5) |
|---|---|---|---|---|---|---|
| Substrate/Base Material | | | D500 | D500 | D500 | D500 |
| Cap Layer Material | | | Dow 6D83K | Dow 6D83K | E (Table 2) | E (Table 2) |
| Amount of TPO in Substrate (wt %) | | | 100 | 91.5 | 100 | 91.5 |
| Amount of Cap Layer in Substrate/Base (wt %) | | | 0 | 8.5 | 0 | 8.5 |
| Cap Layer Composition | | | Virgin | Virgin | Virgin | Virgin |
| Cap Layer MFR (g/10 min @ 230° C./2.16 kg) | | | 2.1 | 2.1 | 0.5 | 0.5 |
| Specific Gravity | D792 | g/cm$^3$ | 1.11 | 1.09 | 1.10 | 1.08 |
| Flexural Modulus (Tangent) | D790 | psi | | | | |
| Machine Direction | | | 304,000 | 298,000 | 301,000 | 296,000 |
| Transverse Direction | | | 282,000 | 283,000 | 242,000 | 287,000 |
| Flexural Strength | D790 | psi | | | | |
| Machine Direction | | | 5,235 | 5,458 | 5,409 | 5,468 |
| Transverse Direction | | | 4,884 | 5,189 | 5,107 | 5,248 |
| Tensile Stress at Yield | D638 | psi | | | | |
| Machine Direction | | | 3,094 | 3,299 | 3,110 | 3,204 |
| Transverse Direction | | | 2,875 | 3,006 | 2,900 | 2,926 |
| Tensile Stress at Break | D638 | psi | | | | |
| Machine Direction | | | 2,273 | 2,059 | 2,248 | 2,338 |
| Transverse Direction | | | 2,260 | 2,252 | 2,243 | 2,234 |
| Tensile Modulus (Tangent) | D638 | psi | | | | |
| Machine Direction | | | 314,000 | 316,000 | 314,000 | 334,000 |
| Transverse Direction | | | 298,000 | 309,000 | 308,000 | 305,000 |
| Yield Elongation | D638 | % | | | | |
| Machine Direction | | | 4.6 | 5.2 | 4.6 | 5.1 |
| Transverse Direction | | | 4.1 | 4.2 | 3.9 | 4.0 |
| Ultimate Elongation | D638 | % | | | | |
| Machine Direction | | | 81.8 | 105.7 | 86.2 | 78.3 |
| Transverse Direction | | | 93.5 | 126.5 | 97.6 | 98.2 |

[1] D 500 substrate with Dow 6D83K cap layer

Table 7 shows the impact properties for all sheets (virgin, regrind, unmodified cap, low MFR cap) are similar but some subtle differences exist at low temperature. Specifically the sheets containing low MFR cap show improved low temperature dart impact performance but slightly lower low temperature notched Izod performance.

TABLE 7

| Sample ID | ASTM Test Method | Units | Commercial[1] | Commercial with Commercial recycle | 5-5[1] (Table 5) | 5-5[1]- recycle (Table 5) |
|---|---|---|---|---|---|---|
| IMPACT PROPERTIES | | | | | | |
| Instrumented Dart Impact Strength[3] | D3763 | | | | | |
| Total Energy | | in-lb | | | | |
| 73° F. | | | 407 | 412 | 400 | 429 |
| 0° F. | | | 372 | 358 | 368 | 454 |
| −20° F. | | | 220 | 208 | 248 | 276 |
| Peak Energy | | in-lb | | | | |
| 73° F. | | | 296 | 287 | 289 | 294 |
| 0° F. | | | 324 | 319 | 334 | 373 |
| −20° F. | | | 204 | 193 | 238 | 258 |
| Peak load | | lb | | | | |
| 73° F. | | | 847 | 858 | 833 | 888 |
| 0° F. | | | 1,249 | 1,209 | 1,280 | 1,279 |
| −20° F. | | | 1,107 | 1,115 | 1,221 | 1,272 |
| Notched Izod Impact Strength 73° F. (23° C.) | D256 | ft-lb/in | | | | |
| Machine Direction | | | 8.8 | 8.2 | 8.6 | 8.6 |
| Transverse Direction | | | 6.8 | 6.5 | 6.3 | 6.6 |
| 0° F. (−18° C.) | | | | | | |
| Machine Direction | | | 1.20 | 1.30 | 2.20 | 0.92 |
| Transverse Direction | | | 1.20 | 0.75 | 1.10 | 0.78 |
| −20° F. (−29° C.) | | | | | | |
| Machine Direction | | | 0.75 | 0.66 | 0.63 | 0.67 |
| Transverse Direction | | | 0.72 | 0.63 | 0.61 | 0. |

Extruded Sheet
[1]All properties, unless otherwise indicated, were measured on 187 mil extruded sheet.
[2]D 500 substrate with 6D83K cap layer.
[3]MTS Impact Tester, 8000"/min., ½" Dia Tup, 3" ID Support, clamped test specimens.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A multiple layer sheet comprising:
(A) a base layer comprising a blend of
   (1) a virgin thermoplastic polyolefin comprising
      (i) an impact propylene copolymer, and
      (ii) an elastomer; and
   (2) a scrap material comprising
      (i) a gloss resin; and
      (ii) a thermoplastic polyolefin, and
(B) a cap layer in contact with the base layer, the cap layer comprising a reaction product of a clarified random propylene/α-olefin copolymer and a coupling agent, the cap layer having a Gardner gloss at 60° of greater than 60 as measured in accordance with ASTM D-523.

2. The multiple layer sheet of claim 1 wherein the gloss resin comprises a reaction product of a clarified random propylene/α-olefin copolymer and a coupling agent; and has a Gardner gloss at 60° of greater than 60 as measured in accordance with ASTM D-523.

3. The multiple layer sheet of claim 1 wherein the gloss resin has a Gardner gloss at 60° of greater than 80.

4. The multiple layer sheet of claim 1 wherein the gloss resin has a melt flow rate from about 0.1 g/10 min to about 2.0 g/10 min as measured in accordance with ASTM D-1238, 2.16 kg at 230° C.

5. The multiple layer sheet of claim 1 wherein the gloss resin has less than 20% haze as measured in accordance with ASTM D-1003.

6. The multiple layer sheet of claim 1 wherein the gloss resin comprises the clarified random propylene/α-olefin copolymer, an elastomer and a coupling agent.

7. The multiple layer sheet of claim 6, wherein the gloss resin has a melt flow rate from about 1.0 g/10 min to about 2.0 g/10 min as measured in accordance with ASTM D-1238, 2.16 kg at 230° C.

8. The multiple layer sheet of claim 1 wherein the virgin thermoplastic polyolefin comprises a blend of (i) a coupled propylene impact copolymer and (ii) an ethylene-propylene elastomer.

9. The multiple layer sheet of claim 1 wherein the cap layer comprises a reaction product of a clarified random propylene/α-olefin copolymer, an elastomer, and a coupling agent.

10. The multiple layer sheet of claim 1 wherein the base layer comprises from about 5 wt % to about 15 wt % of the gloss resin.

11. The multiple layer sheet of claim 1 wherein the melt flow rate of the gloss resin is from about 0.5 g/10 minutes to about 2.0 g/10 minutes as measured in accordance with ASTM D-1238, 2.16 kg at 230° C.

12. The multiple layer sheet of claim 1 wherein the multiple layer sheet has a sag resistance index (SRI) of less than or equal to 1.5, wherein $$SRI = \frac{SR_R}{SR_V}$$

wherein $SR_R$ is the sag rate of the multiple layer sheet and $SR_V$ is the sag rate of the virgin thermoplastic polyolefin.

13. The multiple layer sheet of claim 12 wherein multiple layer sheet has a SRI of from 0.7 to less than or equal to 1.4.

14. The multiple layer sheet of claim 1 wherein the base layer comprises from 40 wt % to 60 wt % scrap material.

15. The multiple layer sheet of claim 1 wherein the multiple layer sheet is a thermoformed sheet.

16. The multiple layer sheet of claim 1 wherein the scrap material is a regrind and is melt blended with the virgin thermoplastic polyolefin.

17. The multiple layer sheet of claim 1 wherein the cap layer has a Gardner gloss at 60° of greater than 80.

18. The multiple layer sheet of claim 1 wherein the melt flow rate of the cap layer is from 0.1 g/10 min to 2.0 g/10 min as measured in accordance with ASTM D-1238, 2.16 kg at 230° C.

19. The multiple layer sheet of claim 1 wherein the melt flow rate of the cap layer is from 0.5 g/10 minutes to 2.0 g/10 minutes as measured in accordance with ASTM D-1238, 2.16 kg at 230° C.

20. The multiple layer sheet of claim, 1 wherein the cap layer has less than 20% haze as measured in accordance with ASTM D-1003.

* * * * *